United States Patent
Marshall

(10) Patent No.: US 11,722,232 B2
(45) Date of Patent: Aug. 8, 2023

(54) ENCAPSULATING ELECTROMAGNETIC PROPAGATION MODEL FEATURES TO CREATE COMPOSABLE PREDICTION MODELS

(71) Applicant: Google LLC, Mountain View, CA (US)

(72) Inventor: Preston Fairfax Marshall, Woodbridge, VA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/649,671

(22) Filed: Feb. 1, 2022

(65) Prior Publication Data

US 2022/0247503 A1 Aug. 4, 2022

Related U.S. Application Data

(60) Provisional application No. 63/145,409, filed on Feb. 3, 2021.

(51) Int. Cl.
H04B 17/391 (2015.01)
(52) U.S. Cl.
CPC ................. H04B 17/3912 (2015.01)
(58) Field of Classification Search
CPC .................................. H04B 17/3912
See application file for complete search history.

(56) References Cited

U.S. PATENT DOCUMENTS

| | | | |
|---|---|---|---|
| 10,117,064 B1 * | 10/2018 | De Lorenzo | H04B 17/391 |
| 10,117,065 B1 | 10/2018 | De Lorenzo et al. | |
| 2003/0073442 A1 * | 4/2003 | Fattouch | H04W 16/18 |
| | | | 455/446 |

OTHER PUBLICATIONS

May 16, 2022 Written Opinion (WO) of the International Searching Authority (ISA) and International Search Report (ISR) issued in International Application No. PCT/US2022/014798.

* cited by examiner

*Primary Examiner* — Natasha W Cosme
(74) *Attorney, Agent, or Firm* — Honigman LLP; Brett A. Krueger

(57) ABSTRACT

A method for encapsulating electromagnetic propagation model features to create composable prediction models includes obtaining electromagnetic (EM) impediment data for a geographical area. The method also includes dividing the geographical area into a plurality of tiles. Each tile of the plurality of tiles includes a geometric shape that encompasses a distinct non-overlapping portion of the geographical area. For each tile of the plurality of tiles, the method also includes determining one or more composable EM attenuation values for EM signals propagating through the distinct non-overlapping portion of the geographical area encompassed by the tile using the EM impediment data and caching the one or more composable EM attenuation values determined for the corresponding tile.

20 Claims, 7 Drawing Sheets

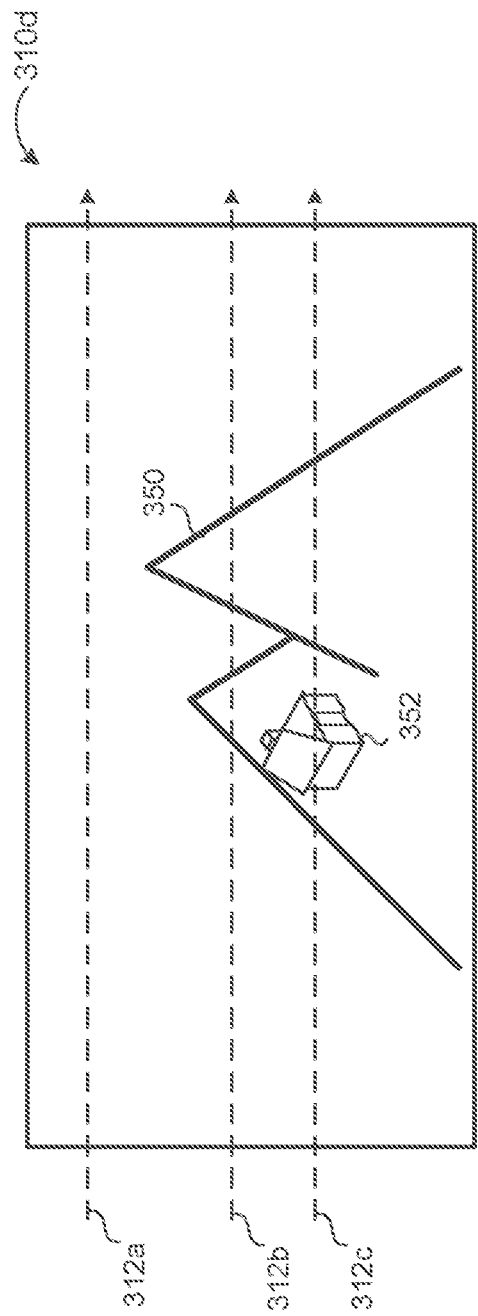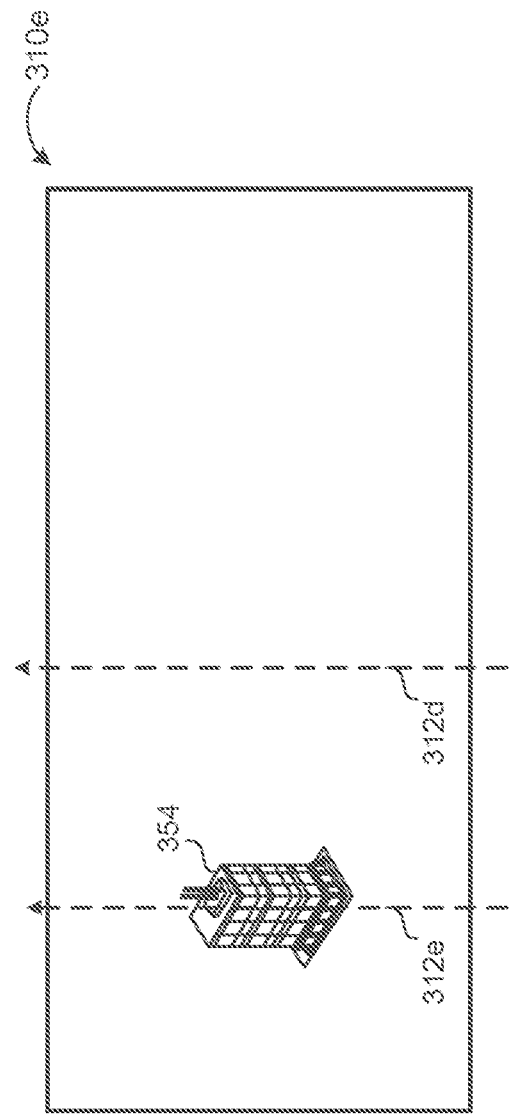

ENCAPSULATING ELECTROMAGNETIC PROPAGATION MODEL FEATURES TO CREATE COMPOSABLE PREDICTION MODELS

CROSS REFERENCE TO RELATED APPLICATIONS

This U.S. patent application claims priority under 35 U.S.C. § 119(e) to U.S. Provisional Application 63/145,409, filed on Feb. 3, 2021. The disclosure of this prior application is considered part of the disclosure of this application and is hereby incorporated by reference in its entirety.

TECHNICAL FIELD

This disclosure relates to encapsulating electromagnetic propagation model features to create composable prediction models.

SUMMARY

One aspect of the disclosure provides a method for encapsulating electromagnetic propagation model features to create composable prediction models. The method includes obtaining electromagnetic (EM) impediment data for a geographical area. The EM impediment data characterizes features of the geographical area that cause EM attenuation. The method also includes dividing the geographical area into a plurality of tiles. Each tile of the plurality of tiles includes a geometric shape that encompasses a distinct non-overlapping portion of the geographical area. For each tile of the plurality of tiles, the method also includes determining one or more composable EM attenuation values for EM signals propagating through the distinct non-overlapping portion of the geographical area encompassed by the tile using the EM impediment data and caching the one or more composable EM attenuation values determined for the corresponding tile. The method also includes obtaining an EM attenuation request from a requester including a request to determine a total non-free-space EM attenuation value between a first geographical point and a second geographical point. The method also includes identifying a first tile that includes the first geographical point, a second tile that includes the second geographical point, and each intervening tile between the first tile and the second tile. For each identified tile, the method also includes selecting at least one cached composable EM attenuation value from the one or more composable EM attenuation values determined for the identified corresponding tile. The method also includes determining the total non-free-space EM attenuation value by summing the selected cached composable EM attenuation values. In response to the EM attenuation request, the method also includes providing the total non-free-space EM attenuation value to the requester.

Implementations of the disclosure may include one or more of the following optional features. The EM impediment data may include terrain impediments and non-terrain impediments. The geometric shape of at least one tile of the plurality of tiles may be a hexagon. In some implementations, the method includes determining a total EM attenuation value using a sum of one or more loss paths of a loss tree. In some examples, determining the total EM attenuation value uses the sum of one or more loss paths of the loss tree includes an algorithmic loss.

In some implementations, determining the one or more composable EM attenuation values for EM signals propagating through the distinct non-overlapping portion of the geographical area encompassed by the tile includes determining at least one composable terrain EM attenuation value and at least one composable non-terrain EM attenuation value. In some examples, determining the one or more composable EM attenuation values for EM signals propagating through the distinct non-overlapping portion of the geographical area encompassed by the tile includes determining at least two composable EM attenuation values for at least two distinct altitudes.

Optionally, determining the one or more composable EM attenuation values for EM signals propagating through the distinct non-overlapping portion of the geographical area encompassed by the tile may include determining at least two composable EM attenuation values for at least two distinct propagation directions through the distinct non-overlapping portion of the geographical area encompassed by the tile. In some implementations, determining the one or more composable EM attenuation values for EM signals propagating through the distinct non-overlapping portion of the geographical area encompassed by the tile includes determining at least two composable EM attenuation values for at least two distinct frequencies. In some examples, determining the one or more composable EM attenuation values for EM signals propagating through the distinct non-overlapping portion of the geographical area encompassed by the tile includes using direct measurements.

Another aspect of the disclosure provides a system that is capable of encapsulating electromagnetic propagation model features to create composable prediction models. The system includes data processing hardware and memory hardware in communication with the data processing hardware. The memory hardware stores instructions that when executed on the data processing hardware cause the data processing hardware to perform operations. The operations include obtaining electromagnetic (EM) impediment data for a geographical area. The EM impediment data characterizes features of the geographical area that cause EM attenuation. The operations also include dividing the geographical area into a plurality of tiles. Each tile of the plurality of tiles includes a geometric shape that encompasses a distinct non-overlapping portion of the geographical area. For each tile of the plurality of tiles, the operations also include determining one or more composable EM attenuation values for EM signals propagating through the distinct non-overlapping portion of the geographical area encompassed by the tile using the EM impediment data and caching the one or more composable EM attenuation values determined for the corresponding tile. The operations also include obtaining an EM attenuation request from a requester including a request to determine a total non-free-space EM attenuation value between a first geographical point and a second geographical point. The operations also include identifying a first tile that includes the first geographical point, a second tile that includes the second geographical point, and each intervening tile between the first tile and the second tile. For each identified tile, the operations also include selecting at least one cached composable EM attenuation value from the one or more composable EM attenuation values determined for the identified corresponding tile. The operations also include determining the total non-free-space EM attenuation value by summing the selected cached composable EM attenuation values. In response to the EM attenuation request, the operations also include providing the total non-free-space EM attenuation value to the requester.

Implementations of the disclosure may include one or more of the following optional features. The EM impediment data may include terrain impediments and non-terrain impediments. The geometric shape of at least one tile of the plurality of tiles may be a hexagon. In some configurations, the operations include determining a total EM attenuation value using a sum of one or more loss paths of a loss tree. In some examples, determining the total EM attenuation value uses the sum of one or more loss paths of the loss tree includes an algorithmic loss.

In some implementations, determining the one or more composable EM attenuation values for EM signals propagating through the distinct non-overlapping portion of the geographical area encompassed by the tile includes determining at least one composable terrain EM attenuation value and at least one composable non-terrain EM attenuation value. In some examples, determining the one or more composable EM attenuation values for EM signals propagating through the distinct non-overlapping portion of the geographical area encompassed by the tile includes determining at least two composable EM attenuation values for at least two distinct altitudes.

In some implementations, determining the one or more composable EM attenuation values for EM signals propagating through the distinct non-overlapping portion of the geographical area encompassed by the tile includes determining at least two composable EM attenuation values for at least two distinct propagation directions through the distinct non-overlapping portion of the geographical area encompassed by the tile.

Optionally, determining the one or more composable EM attenuation values for EM signals propagating through the distinct non-overlapping portion of the geographical area encompassed by the tile may include determining at least two composable EM attenuation values for at least two distinct frequencies. In some implementations, determining the one or more composable EM attenuation values for EM signals propagating through the distinct non-overlapping portion of the geographical area encompassed by the tile includes using direct measurements.

BACKGROUND

Accurate electromagnetic propagation modeling is becoming increasingly critical to both maximize effective use of scarce spectrum resources and to manage the deployment of wireless systems. Accurate electromagnetic propagation modeling requires very detailed data representations of terrain, structures, vegetation, and other impediments to electromagnetic signal energy. Performing propagation modeling requires a large corpus of data to perform the analysis. Collecting the large corpus of data in a single location that is fully accessible to a single processor may be constrained by limited bandwidth, storage, proprietary restrictions, and various national security restrictions that make it impractical to provide the full set of data required for propagation modeling.

DESCRIPTION OF DRAWINGS

FIGS. 3A-3C are schematic views of exemplary tiles of the system of FIG. 1.

Like reference symbols in the various drawings indicate like elements.

DETAILED DESCRIPTION

Figure 1:
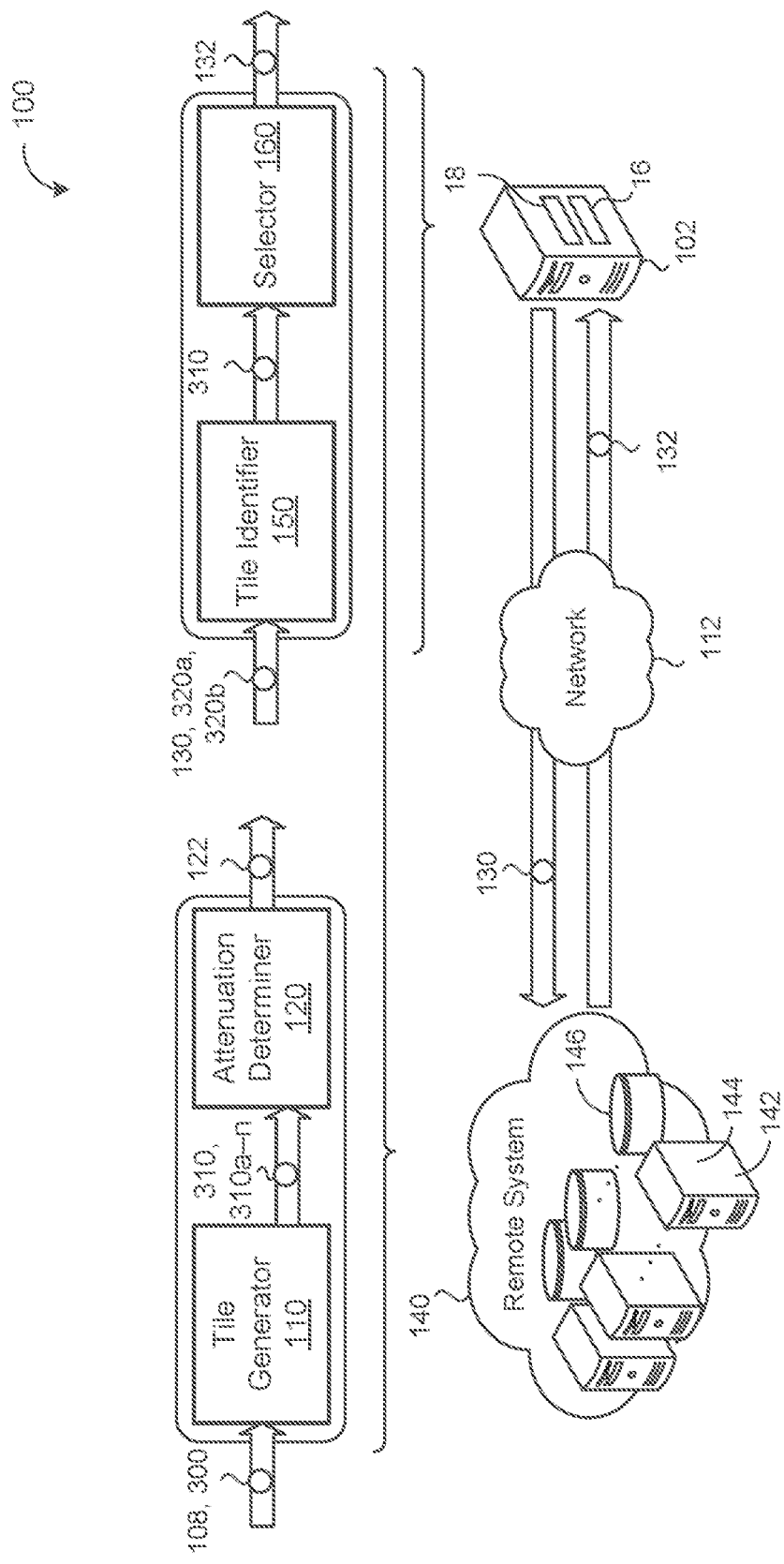
FIG. 1 is a schematic view of a system for encapsulating electromagnetic propagation model features to create composable prediction models.

Electromagnetic (EM) propagation modeling quantifies the amount of EM signal attenuation loss between two or more different geographical points. Today's wireless communications is often highly dependent on accurate EM propagation modeling. However, accurate EM propagation modeling generally requires a large corpus of data (e g, geo-spatial data or measurements) that represents EM signal impediments that reflect or diffract or otherwise attenuate EM signals such as terrain, structures, vegetation, etc. In some instances, service providers with access to an accurate EM propagation algorithm and/or the detailed and valuable EM signal impediment data required for accurate EM propagation modeling desire to keep the data and/or algorithm secret from any third party user. In other instances, even where the third party user has full access to the full set of required data for EM propagation modeling, the computing resources, memory resources, and/or bandwidth resources available to the third party user are insufficient to acquire and perform the EM propagation modeling. Some conventional techniques to avoid replicating or disclosing the underlying data for EM propagation modeling for first or third party users includes transmitting results requested by a third party. However, calculation of these results is still expensive and time consuming and the third party must divulge all the requested paths.

Implementations herein are directed toward a system that encapsulates EM propagation model features to create composable prediction models. The system allows for the computation of EM propagation losses without requiring access to the underlying geographic, topology, measurements, and other geo-data sources (i.e., EM impediment data). The EM impediment data refers to any of the terrain, structures, vegetation, or other features (e.g., time of day, season, weather, etc.) that cause EM attenuation. A processing device associated with a service provider obtains EM impediment data or measurement that characterizes EM signal attenuation for a corresponding geographical area. The EM impediment data includes the data necessary to accurately determine the amount of EM signal attenuation for the corresponding geographical area. The EM impediment data may include data that allows for algorithmic computation (i.e., calculation) of the EM attenuation and/or actual measurement data (e.g., based on or using direct measurements by the service provider, crowd-sourced measurements, etc.). Using the EM impediment data, the service provider may determine, for example, that an EM signal attenuation value between two geographical points that includes a flat open field is very low and the EM signal attenuation value between two different geographical points that includes multiple buildings is comparably high. The processing device associated with the service provider divides the geographical area into a plurality of tiles and determines one or more composable EM attenuation values for each tile using the EM impediment data.

These composable EM attenuation values are EM attenuation values that may be summed with (i.e., added to) other composable EM attenuation values to determine a total EM attenuation value. That is, the composable EM attenuation losses each include a discrete portion of the total EM attenuation (e.g., a subset of the total EM attenuation loss) that may be summed together to determine the total EM attenuation loss. Based on the fact that the effects of attenuative obstructions are linear in their loss, the composable EM attenuations losses allow for a determination of the total EM attenuation loss. The composable EM attenuation losses may include ground wave, terrain attenuation, diffraction, non-terrain attenuation, troposcatter, ionospheric, etc. Note that the engineering standard for path lass is logarithmic (i.e., in dB) and thus adding loss refers to the multiplication of the loss parameters in terms of absolute energy.

In contrast to composable EM attenuation losses, the EM attenuation loss for the free-space path loss is not composable. However, the EM attenuation loss for the free-space path loss may be computed without requiring a large corpus of data. In particular, only the distance between two geographic points and the frequency of an EM signal are required to calculate the EM attenuation loss for free-space path loss as illustrated by the equation:

$$\text{Loss} = 10\log_{10}\left(\left(\frac{4\pi rf}{c}\right)^2\right) \quad (1)$$

In Equation (1), Loss represents the represents the EM attenuation for free-space path loss in decibels, r represents distance between the two geographic points, and f represents the frequency of the EM signal. For a given frequency, Equation (1) may be illustrated by the simplified equation:

$$\text{Loss}=10 \log_{10}((kr)^2) \quad (2)$$

In Equation (2), k represents the constant terms of Equation (1) when the frequency of the EM signal is given. The EM attenuation loss for the free-space path loss, in both Equation (1) and Equation (2), grows non-linearly with frequency and range. Thus, as either frequency or range increase the EM attenuation loss for free-space, the free-space path loss is not composable by discrete additive calculations. That is, because the free-space loss from a first point to a second point is not equal to the sum of the free-space loss between a first point to a third point and the loss from the third point to the second point, where the third point is a mid-point between the first point and the second point, the free-space loss is not composable as expressed by the equation:

$$10\log_{10}\left((kr)^2\right) \neq n10\log_{10}\left(\left(k\frac{r}{n}\right)^2\right) \quad (3)$$

In Equation (3), n represents the number of partitions between a first geographical point and a second geographical point. Therefore, the total EM attenuation loss (e.g., including free-space loss) is not divisible into discrete, composable calculations. However, the EM attenuation for the free-space path loss may be calculated without requiring access to the EM impediment data or algorithms required to determine the composable elements of the total EM attenuation loss. That is, the total EM attenuation loss may be calculated by partitioning the linear (e.g., composable EM attenuation values) and non-linear (e.g., calculated free-space loss) components to calculate the total EM attenuation loss. The processing device associated with the service provider caches each composable EM attenuation value determined for each tile of the geographical area. The tile represents a discrete portion of the overall geographical area. The processing device associated with the service provider may access the cached composable EM attenuation values for each tile to determine a total non-free-space EM attenuation value between two geographical points. In some examples, the processing device associated with the service provider sends or shares some or all of the composable EM attenuation values associated with one or more tiles of the geographical area to the third party (e.g., a consumer) to allow the third party easy EM propagation analysis.

In some scenarios, the service provider obtains a request to determine a total non-free-space EM attenuation value between a first geographical point and a second geographical point. Rather than using the EM impediment data to perform the costly calculation for the non-free-space EM attenuation value, the processing device associated with the service provider accesses the cached composable EM attenuation values (based on or using the tiles associated with the first geographical point and the second geographical point) to determine the non-free space EM attenuation value. The processing device sums the one or more composable attenuation values for each tile between the first geographic point and the second geographic point to determine the total non-free-space EM attenuation value. The processing device associated with the service provider may provide the total non-free-space EM attenuation value to the consumer without revealing the underlying EM impediment data or the algorithm required to determine the composable EM attenuation values.

Thus, to determine the total EM attenuation value (e.g., including free-space loss) the consumer or service provider may add the non-free-space EM attenuation value with the free-space EM attenuation value computed by Equation (1). For example, the processing device (i.e., of the service provider or the third party) sums the one or more composable attenuation values for each tile between the first geographic point and the second geographic point to determine the total non-free-space EM attenuation value. The processing device determines the total EM attenuation value by adding the non-free-space EM attenuation value (e.g., calculated by summing the composable EM attenuation values) with the free-space EM attenuation value computed by Equation (1). This allows for rapid and inexpensive computation of approximate EM path loss between any two geographical points within the geographical area.

Referring now to FIG. 1, in some implementations, an example system 100 includes one or more third party processing devices 102 (i.e., consumers, customers, requestor, etc.) in communication with a remote system 140 via a network 112. The processing device 102 may correspond to any computing device, such as a desktop workstation, a laptop workstation, a server, a distributed computing system, etc. The processing device 102 includes computing resources 16 (e.g., data processing hardware) and/or storage resources 18 (e.g., memory hardware). In some implementations, the remote system 140 and the third party processing device 102 are different parties. However, in some examples, remote system 140 and the third party processing device 102 are the same party. In some implementations, the remote system 140 and the third party processing device 102 are co-located (e.g., within a cloud computing cluster).

The remote system 140 (i.e., the service provider) may be a single computer, multiple computers, or a distributed system (e.g., a cloud environment) having scalable/elastic resources 142 including computing resources 144 (e.g., data processing hardware) and/or storage resources 146 (e.g., memory hardware). The remote system 140 may include, or be in communication via the network 112, one or more processing devices 102. In some examples, the data processing hardware 16 and memory hardware 18 for the processing device 102 is substantially similar to the data processing hardware 144 and memory hardware 146 for the remote system 140. In other examples, the data processing hardware 16 and/or memory hardware 18 of the processing device 102 are less than the resources of the remote system 140 and insufficient to perform conventional EM propagation modeling.

In some implementations, the remote system 140 (i.e., the service provider) includes a tile generator 110 and an attenuation determiner 120. The tile generator 110 obtains EM impediment data 108 for a geographical area 300 that characterizes features of the geographical area 300 that cause EM attenuation. That is, the EM impediment data 108 represents the data necessary to determine EM signal attenuation losses from features within the geographical area 300. The EM impediment data 108 may represent EM attenuation loses due to terrain impediments and non-terrain impediments. Terrain impediments include fixed terrain features that cause EM attenuation such as mountains, trees, hills, etc. Non-terrain impediments include vegetative or man-made impediments such as buildings and other structures. In some examples, the EM impediment data 108 represents an urban area that includes multiple buildings (e.g., non-terrain impediments) that cause EM attenuation. In other examples, the EM impediment data 108 represents rural areas that include forests (e.g., terrain impediments) that cause EM attenuation. The EM impediment data 108 may also include empirical data gathered from measurements of EM loss.

The tile generator 110 divides the geographical area 300 into a plurality of tiles 310*a*-*n*. Each tile 310 of the plurality of tiles 310 includes a geometric shape that encompasses a distinct non-overlapping portion of the geographical area 300. In some examples, the tile generator 110 generates the plurality of tiles 310 for the geographical area 300 based on or using the obtained EM impediment data 108. That is, the EM impediment data 108 influences the size and/or shape of the tiles 310. In other examples, the tile generator 110 generates the plurality of tiles 310 for the geographical area 300 independent of the EM impediment data 108. For example, the tile generator 110 divides the geographical area 300 into a plurality of tiles 310 with predetermined geometric shapes and sizes without the influence of any EM impediment data 108. The plurality of tiles 310 may be any geometric shape (e.g., hexagon, square, circle, etc.) or size. In some examples, each tile 310 is uniform in shape and size (e.g., a hexagon tile with an area of 100 km), while in other examples, tiles 310 have a different shapes and size (e.g., based on or using associated EM impediment data 108).

The tile generator 110 sends each generated tile 310 of the plurality of tiles 310 to the attenuation determiner 120. The attenuation determiner 120 determines, for each tile 310 of the plurality of tiles 310, one or more composable EM attenuation values 122 for EM signals propagating through the geographical area 300 encompassed by the tile 310 (separate from any free-space loss) based on the EM impediment data 108. That is, the attenuation determiner 120 determines one or more composable EM attenuation values 122 that represent composable or additive losses (e.g., terrain attenuation, diffraction, or non-terrain attenuation) for each tile 310. For example, the attenuation determiner 120 may determine a composable terrain EM attenuation value 122 and a composable non-terrain attenuation loss for a single tile 310. The attenuation determiner 120 may represent each composable EM attenuation value 122 independently for the respective tile 310 or sum each of the composable EM attenuation value 122 for the respective tile 310 represented by a single composable EM attenuation value 122. In some examples, the composable EM attenuations values 122 represent a "one-way hash" of EM impediment data 108 (e.g., geo-spatial data) that encodes the composable EM attenuation values 122. That is, any third party processing device 102 is unable to discern the source data (e.g., EM impediment data 108) or algorithm used to determine the composable EM attenuation values 122.

The remote system 140 (i.e., the service provider) caches or otherwise stores the one or more composable EM attenuation values 122 (e.g., at memory hardware 146). Each composable EM attenuation value 122 is associated with a specific tile 310. The service provider, or a user authorized by the service provider, may access the cached composable EM attenuations values 122, via the remote system 140, to determine the total non-free-space attenuation loss without the need to recalculate the one or more composable EM attenuation values 122 for each tile 310. That is, after the remote system 140 caches the composable EM attenuations values 122, the service provider may access the cached composable EM attenuation values 122 to determine the total EM attenuation value 132. By accessing the cached composable EM attenuation values 122, the remote system 140 calculates the total EM attenuation value 132 using less computing resources 144. In some implementations, the remote system 140 transmits, via the network 112, one or more composable EM attenuation values 122 associated with one or more tiles 310 of the geographical area 300 to one or more third party processing devices 102. In this example, the one or more third party processing devices 102 may cache or store the one or more composable EM attenuation values 122 in the memory hardware 18 of the processing device 102.

In some examples, the remote system 140 obtains an EM attenuation request 130 from an application executing on the remote system 140 or a third party processing device 102 (i.e., a customer or client or user associated with the third party processing device 102) to determine a total EM attenuation value 132 between a first geographical point 320*a* and a second geographical point 320*b*. In some examples, the remote system 140 transmits the composable EM attenuation values 122 to the third party processing device 102 and the third party processing device 102 determines the total EM attenuation value 132 without the intervention of the remote system 140. Here, however, the third party sends an EM attenuation request 130 to retrieve the total EM attenuation value 132 from the remote system 140. In this scenario, the remote system 140 may separately calculate the free-space loss (e.g., using Equation (1) and include it within the total EM attenuation value 132 or the remote system 140 may transmit the total EM attenuation value 132 without the free-space loss and the third party processing device 102 may instead determine the free-space loss. That is, in some examples, the total EM attenuation value 132 includes the free-space loss and in other examples, the total EM attenuation value 132 does not include the free-space loss. In either scenario, the service provider (of the remote system 140) may keep secret from the third party processing device 102 the underlying EM impediment data 108 and algorithm used to determine the composable EM attenuation values 122 for each tile 310.

The remote system 140 may further include a tile identifier 150 and a selector 160. Alternatively or additionally, the third party processing device 102 includes the tile identifier 150 and selector 160. It is understood that any discussion regarding the tile identifier 150 and the selector 160 could take place at either the remote system 140 or the third party processing device 102 (i.e., when the remote system 140 has transmitted the EM attenuation values 122 for the tiles 310 to the third party processing device 102). When the remote system 140 receives an EM attenuation request 130, the tile identifier 150 may identify, based on or using the EM attenuation request 130, a first tile 310 that includes the first geographical point 320a and a second tile 310 that includes the second geographical point 320b from the EM attenuation request 130. The tile identifier 150 also identifies each intervening tile 310 between the first tile 310 and the second tile 310 (FIG. 3).

The tile identifier 150 sends each identified tile 310 to the selector 160. The selector 160 is configured to access the associated composable EM attenuation values 122 for each identified tile 310 (e.g., from the memory hardware 146) of the remote system 140. The selector 160, sums each cached composable EM attenuation value 122 associated with the identified tiles 310 to determine the total EM attenuation value 132. The remote system 140 provides the total EM attenuation value 132 (with or without the free-space loss) to the third party processing device 102.

As discussed previously, in some implementations, the remote system 140, instead of receiving EM attenuation requests 130, transmits one or more composable EM attenuation values 122 for one or more tiles 310 of the geographical area 300 to the third party processing device 102. The processing device 102 caches or otherwise stores the composable EM attenuations value 122 in the memory hardware 18 of the processing device 102. In these implementations, the processing device 102 accesses the composable EM attenuations values 122 to determine the total EM attenuation value 132 between two different geographical points 320 of the geographic area 300 represented by the tiles 314. That is, the processing device 102 sums each composable EM attenuation value 122 for the respective identified tiles 310 between the two geographical points 320. Here, the processing device 102 determines the total EM attenuation value 132 locally on the data processing hardware 16 of the processing device 102. Because typically the EM loss must be periodically determined (i.e., once an hour, once a day, once a week, etc.), in this way, the third party processing device 102 may request the tiles 310 a single time and repeatedly use the stored composable EM attenuation values 122 to determine EM losses for different geographical points 320. The remote system 140 may periodically update one or more composable EM attenuation values 122 for one or more tiles 310 based on changing conditions.

Figure 2:
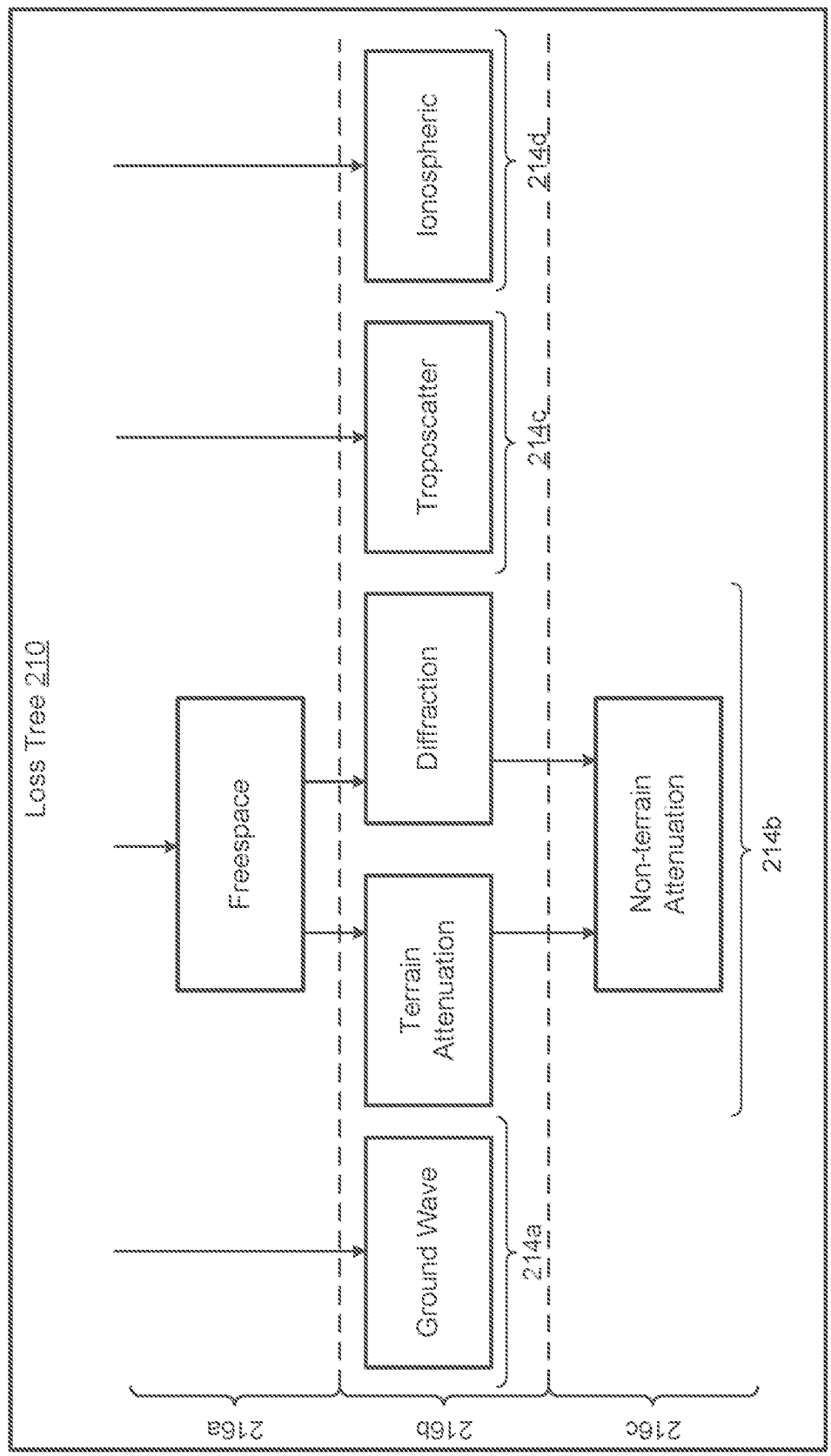
FIG. 2 is a schematic view of a loss tree with a plurality of electromagnetic loss paths.

Referring now to FIG. 2, in some implementations, the selector 160 uses a loss tree 210 to determine some or all of the total EM attenuation value 132. The loss tree 210 includes multiple loss paths 214, 214a-d to determine the total EM attenuation value 132. Each loss path 214 of the loss tree 210 may include multiple layers 216, 216a-c. Each layer 216 represents an EM signal attenuation loss. For example, a first loss path 214a includes a single layer 216b for ground wave. A second loss path 214b includes three layers 216a-c of free-space, terrain attenuation/diffraction, and non-terrain attenuation, while a third loss path 214c includes a single layer 216b troposcatter, and a fourth loss path 214d includes a single layer 216 ionospheric. Because each layer 216 is composable, the loss of each layer 216 may be summed to determine the total EM loss for the respective loss path 214. For example, a composable terrain EM attenuation value 122 from the layer 216b is summed with the composable non-terrain attenuation value 122 from the layer 216c.

The loss tree 210 may include any number of loss paths 214 (each with any number of layers 216) that each represent a portion of the total EM attenuation value 132. The serially connected layers 216 of each loss path 214 (e.g., connected by arrows) in the loss tree 210 represent additive (i.e., composable) attenuation losses (i.e., composable EM attenuation values 122). As used herein, composable refers to the characteristic that allows the loses to be selected and assembled (i.e., combined or summed) based design constraints. In particular, serially connected layers 216 in the loss tree 210 include an algorithmic loss or composable EM attenuation value 122 that may be summed to determine the total EM attenuation value 132. For example, a serially connected loss path 214 includes the free-space, terrain attenuation, and non-attenuation layers 216 to determine the total EM attenuation value 132 (e.g., including free-space attenuation loss). The free-space loss may be calculated with the algorithm in Equation (1). The terrain attenuation and non-terrain attenuation loss may be calculated using the EM impediment data 108 and/or via measurement. The total EM attenuation value 132 for the second loss path 214b, in this example, is determined by summing the free-space loss, terrain attenuation, and non-terrain attenuation losses.

It is worth noting that typically a single path dominates the loss between two particular points. That is, generally speaking, when the ground wave attenuation is low, troposcatter and ionspheric attenuation are insignificant. In this respect, only a single loss path 214 (dependent upon the geographical points 320) dominates the total EM loss between the two geographical points 320.

Figure 3A:
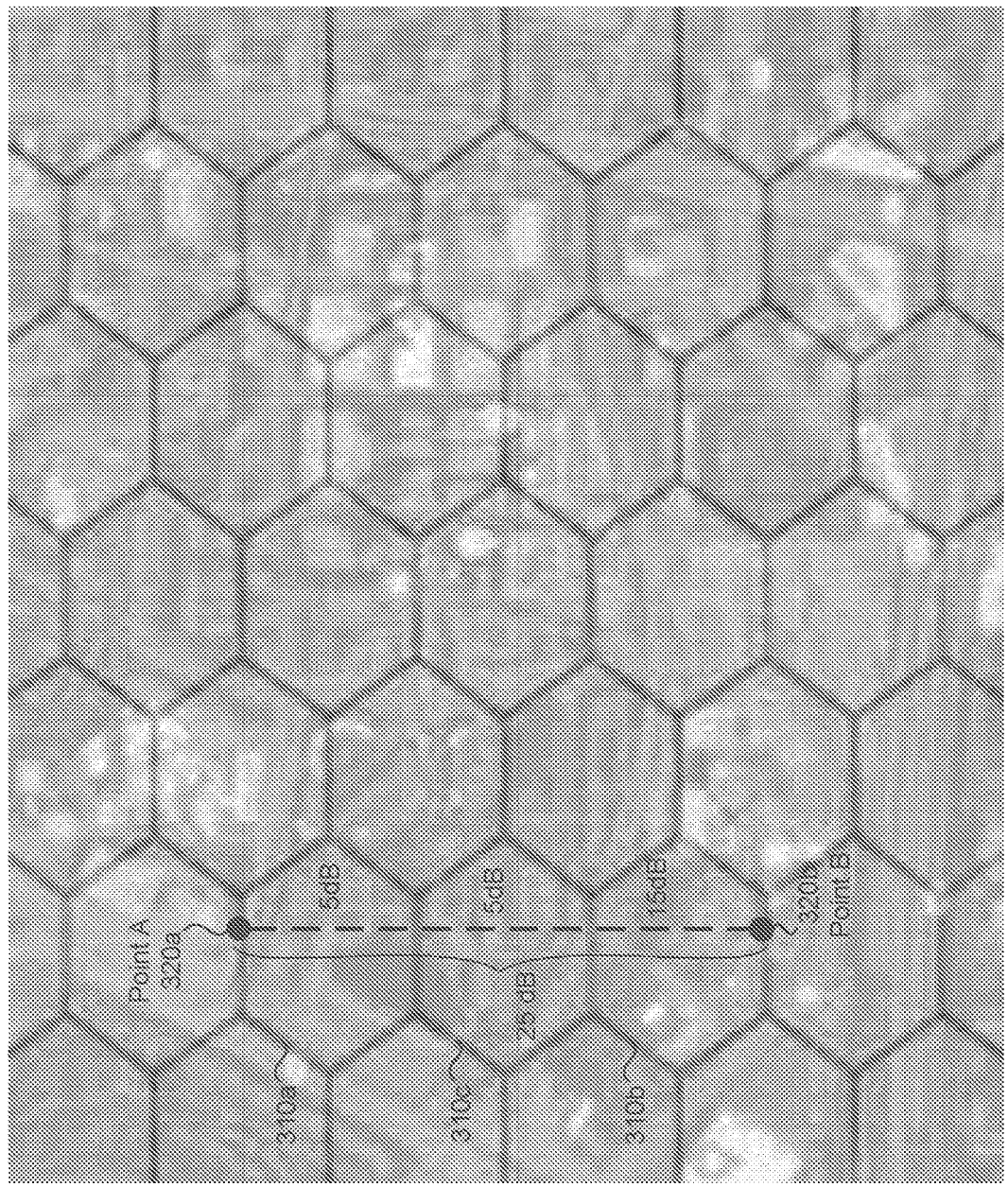

Referring now to FIG. 3A, in some implementations, the tile generator 110 divides the geographical area 300 into the plurality of tiles 310. In this example, each tile 310 is a hexagon shape. Each hexagon tile 310 of the plurality of hexagon tiles 310 cover a distinct (i.e., non-overlapping) portion of the geographical area 300. The tile generator 110 sends each tile 310 of the plurality of tiles 310 to the attenuation determiner 120.

The attenuation determiner 120 determines one or more composable EM attenuation values 122 of EM signals propagating through the each tile 310 of the plurality of tiles 310. For example, the attenuation determiner 120 determines a first tile 310a includes a terrain loss of 5 dB and a non-terrain loss of 5 dB. That is, an EM signal that traverses the geographical region bounded by the first tile 310a can expect to experience a 5 dB loss due to terrain and a 5 dB loss due to non-terrain. The composable EM attenuation loss for the tiles 310 may be represented by each composable attenuation loss independently (e.g., 5 dB of terrain loss and 5 dB of non-terrain loss) or by the sum of each composable attenuation loss (e.g., 10 dB of terrain and non-terrain loss). The remote system 140 caches each of the one or more composable EM attenuation values 122 for the corresponding tiles 310 that represent the geographical area 300.

In the example shown, the remote system 140 (or, alternatively, a third party processing device 102 that obtained the tiles 310 from the remote system 140) determines the total EM attenuation value 132 between a first geographical point 320a ("Point A") and a second geographical point 320b ("Point B"). Here, the tile identifier 150 identifies a first tile 310a that includes the first geographical point 320a and a second tile 310b that includes the second geographical point 320b. The tile identifier 150 also identifies a third tile 310c that intervenes between the first tile 310a and the second tile 310b. The selector 160 selects one or more composable EM attenuation value associated with each of the identified tiles 310a-c previously stored to determine the total EM attenuation value 132. That is, rather than directly calculating the total EM attenuation value between Point A and Point B, the selector 160 sums each precomputed composable EM attenuation value of each of the identified tiles 310a-c. For example, the selector 160 accesses the memory hardware 18, 146 for the composable EM attenuation value of 5 dB for the first tile 310a, 15 dB for the second tile, and 5 dB for the third tile. The selector 160 sums each of the cached composable EM attenuation values 122 for each respective identified tile 310a-c to determine the total EM attenuation value 132 (e.g., 25 dB of loss). Optionally, the selector 160 determines the free space loss (e.g., based on Equation (1)) and sums the free space loss with the total EM attenuation value 132 such that, in some examples, the total EM attenuation value 132 includes the free space loss while in other examples, the total EM attenuation value 132 does not include the free space loss.

In some examples, the attenuation determiner 120 determines multiple composable EM attenuation values 122 for each layer 216 of the loss path 214 for a respective tile 310 to increase the accuracy of the total EM attenuation value 132 at the cost of initial processing and storage. That is, EM signals that propagate through the tile 310 at different altitudes, directions, frequencies, etc. experience different amount of EM loss. For example, an EM signal at a height of 30 meters bypasses many of the buildings that cause non-terrain attenuation while an EM signal at a height of 5 meters does not. The parameters that affect the EM loss in different ways may be reflected in the EM impediment data 108. As another example, an EM signal propagating through a center of a tile 310 is not subject to attenuation by an impediment at an edge of the tile 310 because the impediment is not within the propagation path of the EM signal. Accordingly, in this example, an EM loss of a signal that propagates through the center of the tile 310 may not accurately reflect the EM loss of a signal that does not propagate through the center of the tile 310.

Referring now to FIG. 3B, an exemplary tile 310d represents a geographical area 300 that includes a mountain 350 (i.e., a terrain impediment) and a house 352 (i.e., a non-terrain impediment) on the mountain 350. In some examples, the attenuation determiner 120 determines multiple different composable EM attenuation values 122 at different altitudes. For example, the attenuation determiner 120 models (e.g., using a terrain model and/or a non-terrain model) or measures a first EM signal 312a that propagates through the tile 310 at a first altitude that is above the top of the house and mountain. The first EM signal 312a, at the first altitude, propagates through the tile 310 with minimal attenuation because the impediments 350, 352 are not within the propagation path of the first EM signal 312a at the first altitude. The attenuation determiner 120 determines a first composable EM attenuation value 122 for the first EM signal 312a to accurately reflect signals that are not affected by the impediments.

As another example, the attenuation determine 120 models or measures a second EM signal 312b that propagates through the same tile 310 at a second altitude. The second EM signal 312b, at the second altitude, attenuates while propagating through the tile 310 because the mountain 350 is within the propagation path. The attenuation determiner 120 determines a second composable EM attenuation value 122 for the second EM signal 312b to accurately reflect signals that are at the second altitude. As yet another example, the attenuation determiner 120 models or measures a third EM signal 312c that propagates through the same tile 310 at a third altitude. The third EM signal 312c, at the third altitude, attenuates while propagating through the tile 310 due to both the mountain 350 and the house 352 are within the propagation path. The attenuation determiner 120 determines a third composable EM attenuation value 122 for the third EM signal 312c to accurately reflect signals that are at the third altitude. Accordingly, when the selector 160 selects the composable EM attenuation values 122 to determine the total EM attenuation value 132, the selector 160 may select among multiple different composable EM attenuation values 122 for the same tile 310 and same loss path 214 based on parameters of the geographical points 320 (e.g., altitude) and/or of the types of EM signals in use.

Referring now to FIG. 3C, an exemplary tile 310e represents a geographical area 300 that includes a building 354 (i.e., a non-terrain impediment) near the perimeter (i.e., the left side) of the tile 310. In some implementations, the attenuation determiner 120 determines composable EM attenuation values 122 that intersect the tiles 310 at different angles, propagation direction (e.g., north to south, east to west, etc.), and positions. Here, the attenuation determiner 120 models EM signals 312d, 312e that intersects a center of the tile 310. The first EM signal 312d propagates through the tile 310 with minimal attenuation because the building 354 is not within the propagation path of the first EM signal 312d. The attenuation determiner 120 also models or measures another second EM signal 312e that propagates through the same tile 310 at a different entry and exit point (i.e., near the left side) of the tile 310. The other EM signal 312e attenuates while propagating through the tile 310 because the building 354 is within the propagation path. Accordingly, the attenuation determiner 120 determines separate composable EM attenuation values 122 for each of the EM signals 312d, 312e.

The attenuation determiner 120, based on design constraints, may store any number of different composable EM attenuation values 122 based on any number of different parameters. For example, the attenuation determiner 120 determines composable EM attenuation values 122 based on different frequencies. For example, a tile 310 may include impediments that significantly attenuate EM signals at one frequency while minimally attenuating EM signals at other frequencies. Thus, in order to provide greater resolution of the EM impediment data 108 (and thus provide a more accurate total EM attenuation value 132), the attenuation determiner 120 may determine and store composable EM attenuation values 122 based on multiple attributes or parameters (e.g., frequency, altitude, direction, angle, date, time, weather, etc.). For example, the attenuation determiner may determine two or more composable EM attenuation values 122 for two or more distinct frequencies (i.e., the frequency of the EM signal), two or more distinct propagation directions, etc.

The remote system 140 may store many different composable EM attenuation values 122 based on a number of parameters and may transmit only a subset of these composable EM attenuation values 122 to a third party processing device 102. For example, for a given geographical area 300, the third party processing device 102 may request all composable EM attenuation values 122 below a threshold height, thus reducing the bandwidth required to transmit the requested composable EM attenuation values 122. The third party processing device 102 may be interested in only certain types of communications that are dominated by certain EM attenuation. For example, a mid-band cellular network does not have any significant propagation by ground or ionospheric reflection and the loss paths and associated EM attenuation values 122 may not be necessary. The remote system 140 may aggregate different composable EM attenuation values 122 based on design requirements. That is, the remote system 140 and/or the third party processing device 102 may tailor the loss paths 214, the layers 216, and the associated composable EM attenuation values 122 based on individual uses with specific ranges of power levels, environments, wavelengths, and the range of path losses for which results are useful.

The selector 160, in some implementations, selects specific loss paths 214 based on characteristics of the geographic area 300 between the geographical points 320. For example, a special case may occur when the path between the geographical points 320 is below ground. In this case, a terrain model may provide a very high path loss. However, there may be alternative mechanisms for energy to pass through the region (e.g., ground wave, diffraction, troposcatter, etc.). These mechanisms tend to be frequency specific, and the selector 160 may select or invoke different loss paths 214 to, for example, replace the terrain model by another modality (e.g., diffraction) or to represent an entirely alternative physics (i.e., ground wave). The selector 160 may include such analytic features to select the loss paths 214 based on resolution required in the total EM attenuation value 132, power levels, frequency of use, etc.

In some implementations, the tile generator 110 determines the size and/or shape of the tiles 310 based on the EM impediment data 108. For example, an area that has rapid or substantial changes in loss pattern over short distances (e.g., an urban environment) may include very small tiles. On the other hand, an area that is uniform (e.g., a desert) that results in only small changes in the loss patterns may include very large tiles. That is, tiles 310 that represent a smaller geographical area 300 may provide a greater resolution of the EM impediment data Put another way, EM signals propagating through smaller geographical areas 300 are more likely to attenuate for any impediments within the geographical area 300 than EM signals propagating through larger geographical areas 300. The size of the tiles 310 may be balanced based on design needs with the number of different composable EM attenuation values 122 stored for each tile 310. That is, larger tiles 310 may necessitate a greater number of composable EM attenuation values 122 stored for each tile 310 due to the greater variation in EM propagation signals that must be represented.

In some examples, the remote system 140 generates different tiles 310 for different layers 216 of the loss path. For example, tiles 310 associated with terrain attenuation may be associated with a first size while tiles 310 associated with non-terrain attenuation may be associated with a second size. In this example, tiles 310 for the same layer 216 do not overlap, but tiles for different layers 216 would necessarily overlap. For example, in a city environment, the terrain may change gradually while the non-terrain attenuation varies wildly. In this example, the tiles 310 associated with terrain attenuation may be large (reflecting the relatively small changes in terrain) while the tiles 310 associated with non-terrain attenuation may be comparatively smaller (reflecting the large changes in non-terrain attenuation).

Figure 4:
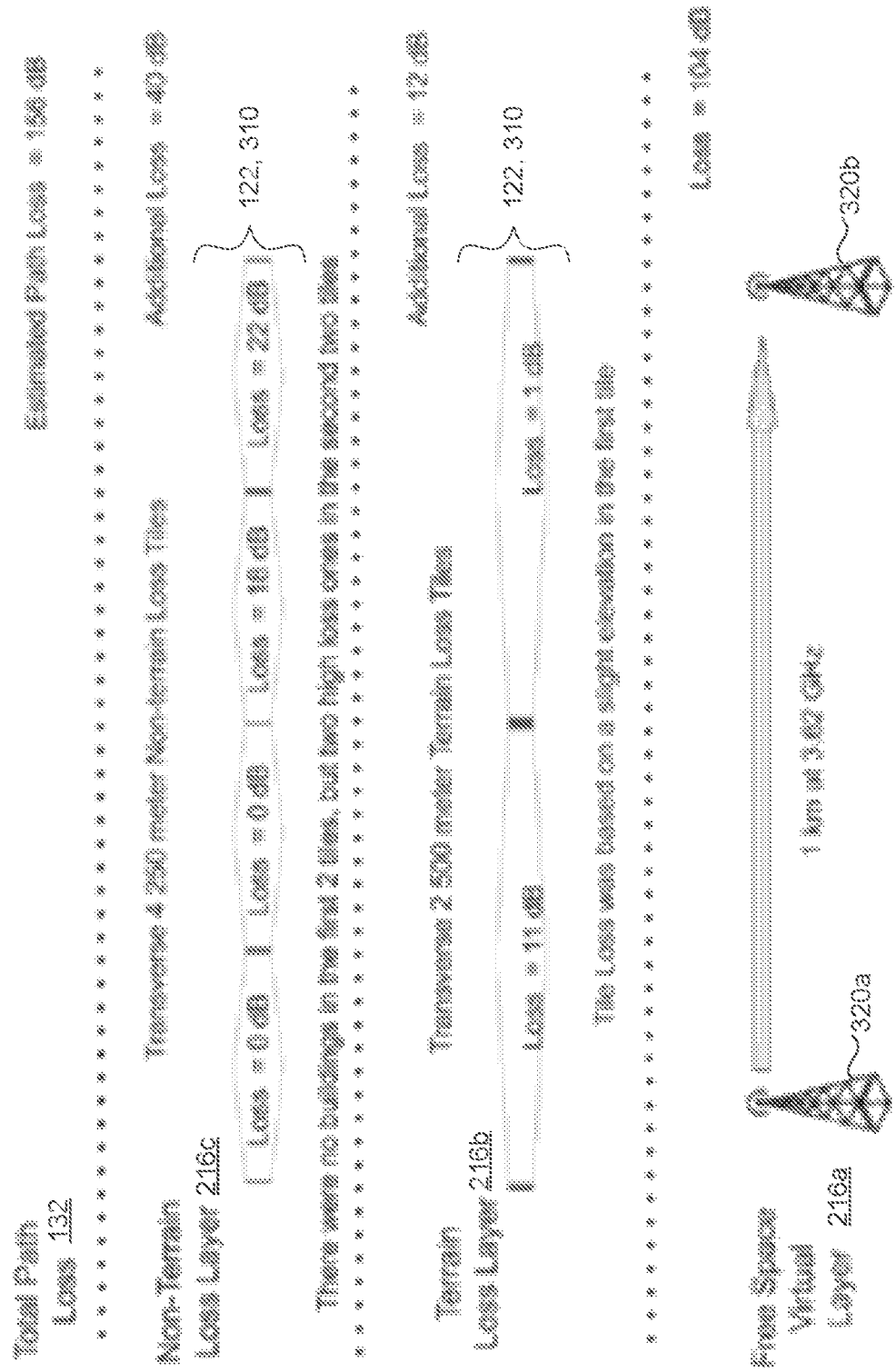
FIG. 4 is a schematic view of composable elements of the tiles of FIGS. 3A-3C.

Referring now to FIG. 4, in some implementations, the remote system 140 may have access to the full set of EM impediment data 108 required to calculate the total EM attenuation value 132 between the first point 320a and the second point 320b. The third party processing device 102, however, may not have access to the some or all of the EM impediment data 108 required to calculate the total EM attenuation value 132 between the first point 320a and the second point 320b. Here, the algorithm and/or underlying EM impediment data 108 used to calculate the total EM attenuation value 132 may be proprietary to the remote system 140 such that the algorithm and/or underlying EM impediment data 108 is kept secret from the customer 12. Additionally or alternatively, the third party processing device 102 may lack the resources or the desire to allocate the necessary resources to calculate the total EM attenuation value 132.

Moreover, the tiles 310 provide compact storage of a large amount of data (i.e., EM impediment data 108). For example, a region 25 km by 25 km may require tens or hundreds of gigabytes to store the EM impediment data 108 necessary for traditional EM propagation analysis. However, when divided into, for example, 10,000 tiles (with each tile 250 meters by 250 meters), each tile may include EM attenuation values 122 for five different altitudes, two different center frequencies each in two different directions. In this example, each tile includes a total of twenty EM attenuation values 122 for a total of 200,000 total EM attenuation values 122 which may require a megabyte or less of storage.

In the example shown, the total EM attenuation value 132 between the first point 320a and the second point 320b is 156 dB. Here, the total EM attenuation value 132 includes a non-terrain layer 216c, a terrain layer 216b, and a free-space layer 216a loss. The remote system 140 (or the third party processing device 102) retrieves at least one composable EM attenuation value 122 for each tile 310 of the plurality of tiles 310 between the first point 320a and the second point 320b. Here, the non-terrain layer 216c loss includes different tiles 310 of a different size than the tiles 310 associated with the terrain layer 216b. The remote system 140 and/or the third party processing device 102 may compute the total EM attenuation value 132 from the first point 320a to the second point 320b based on the retrieved composable EM attenuation values 122 for each tile in the non-terrain layer 216c and the terrain layer 216b (in addition to the free-space loss). The remote system 140 sums the composable EM attenuation values 122 to determine the total EM attenuation value 132. Specifically, the remote system 140 sums the non-terrain layer 216c loss of four tiles i.e., 0+0+18+22=40 dB) and terrain layer 216b loss of two tiles (i.e., 11+1=12 dB) for the total non-free-space EM attenuation loss of 52 dB.

In some examples, the remote system 140 and/or the third party processing device 102 determines the total EM attenuation value 132 by adding the free-space layer 216a loss to the total EM attenuation value 132. The free-space layer 216a loss is not included in the composable EM attenuation values 122 as the free-space layer 216a loss is not composable, as discussed above. However, calculation of the free-space layer 216a loss based on the frequency and range of the EM signal from the first point 402 to the second point 404 is straightforward (e.g., Equation (1)). The frequency and range of the EM signal may be included in the EM attenuation request 130. Here, the range and frequency of the EM signal are 1 km and 3.62 GHz respectively for a total loss of 104 dB. The remote system 140 and/or processing device 102 sums the total non-free-space EM attenuation value (e.g., 52 dB) with the free-space layer 216a loss to determine the total EM attenuation value 132 of 156 dB.

In some implementations, the selector 160 includes additional computation prior to summing the EM attenuation values 122. For example, the selector 160 may apply interpolation to some or all of the EM attenuation values 122 to determine estimated values for each tile to make up for a lack in matching angles of transit, frequencies, or altitude. For example, when the EM attenuation value 122 for a given tile 310 is for signal at an altitude of 10 meters, but the actual signal is at 12 meters, the selector 160 may apply conventional interpolation or extrapolation techniques to estimate the EM attenuation value 122 for a signal at 12 meters.

Figure 5:
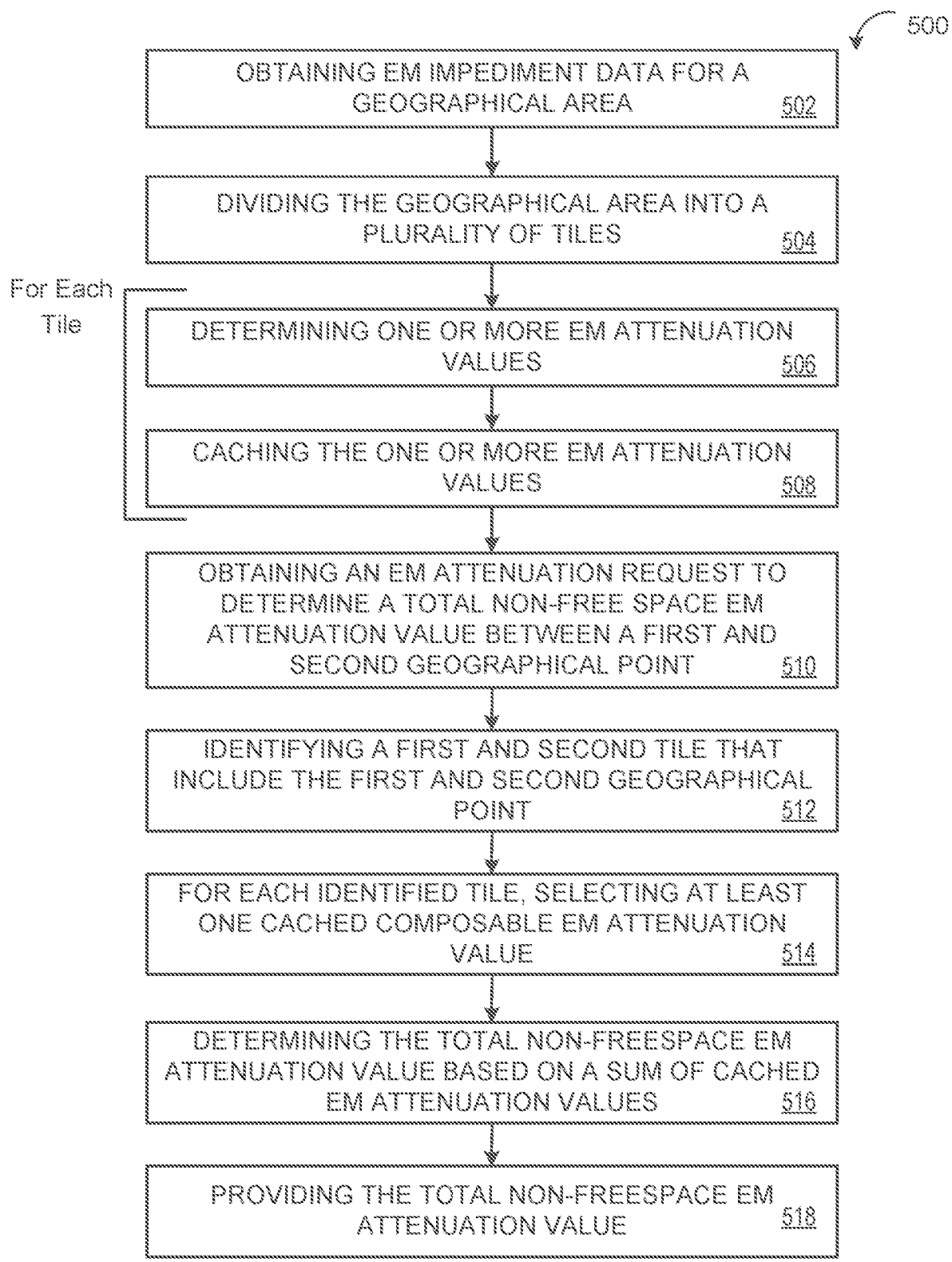
FIG. 5 is a flowchart of an example arrangement of operations for a method of encapsulating electromagnetic propagation model features to create composable prediction models.

FIG. 5 is a flowchart of an exemplary arrangement of operations for a method 500 for encapsulating electromagnetic propagation model features to create composable prediction models. The method 500, at step 502, includes obtaining EM impediment data 108 for a geographical area 300. The EM impediment data 108 characterizes the features of the geographical area 300 that cause attenuation of EM signals. The method 500, at step 504, includes dividing the geographical area 300 into a plurality of tiles 310. Each tile 310 includes a geometric shape that encompasses a distinct non-overlapping portion of the geographical area 300. For each tile 310 of the plurality of tiles 310, the method 500, at step 506, includes determining one or more composable EM attenuation values 122 of EM signals propagating through the distinct non-overlapping portion of the geographical area 300 encompassed by the tile 310 based on the EM impediment data 108. The method 500, at step 508, includes caching the one or more composable EM attenuation values 122 determined for the corresponding tile 310.

The method 500, at step 510, includes obtaining an EM attenuation request 130 that includes a request to determine a total EM attenuation value 132 between a first geographical point and a second geographical point. The method 500, at step 512, includes identifying a first tile 310 that includes the first geographical point, a second tile 310 that includes the second geographical point, and each intervening tile 310 between the first tile 310 and the second tile 310. For each identified tile, the method 500, at step 514, includes selecting at least one cached composable EM attenuation value 122 from the one or more composable EM attenuation values 122 determined for the identified corresponding tile 310. The method 500, at step 516, includes determining the total EM attenuation value 132 based on a sum of the selected cached composable EM attenuation values 122. The method 500, at step 518, includes providing the total EM attenuation value 132. The total EM attenuation value 132 may be added to the free-space EM attenuation value to determine the total EM attenuation value.

Figure 6:
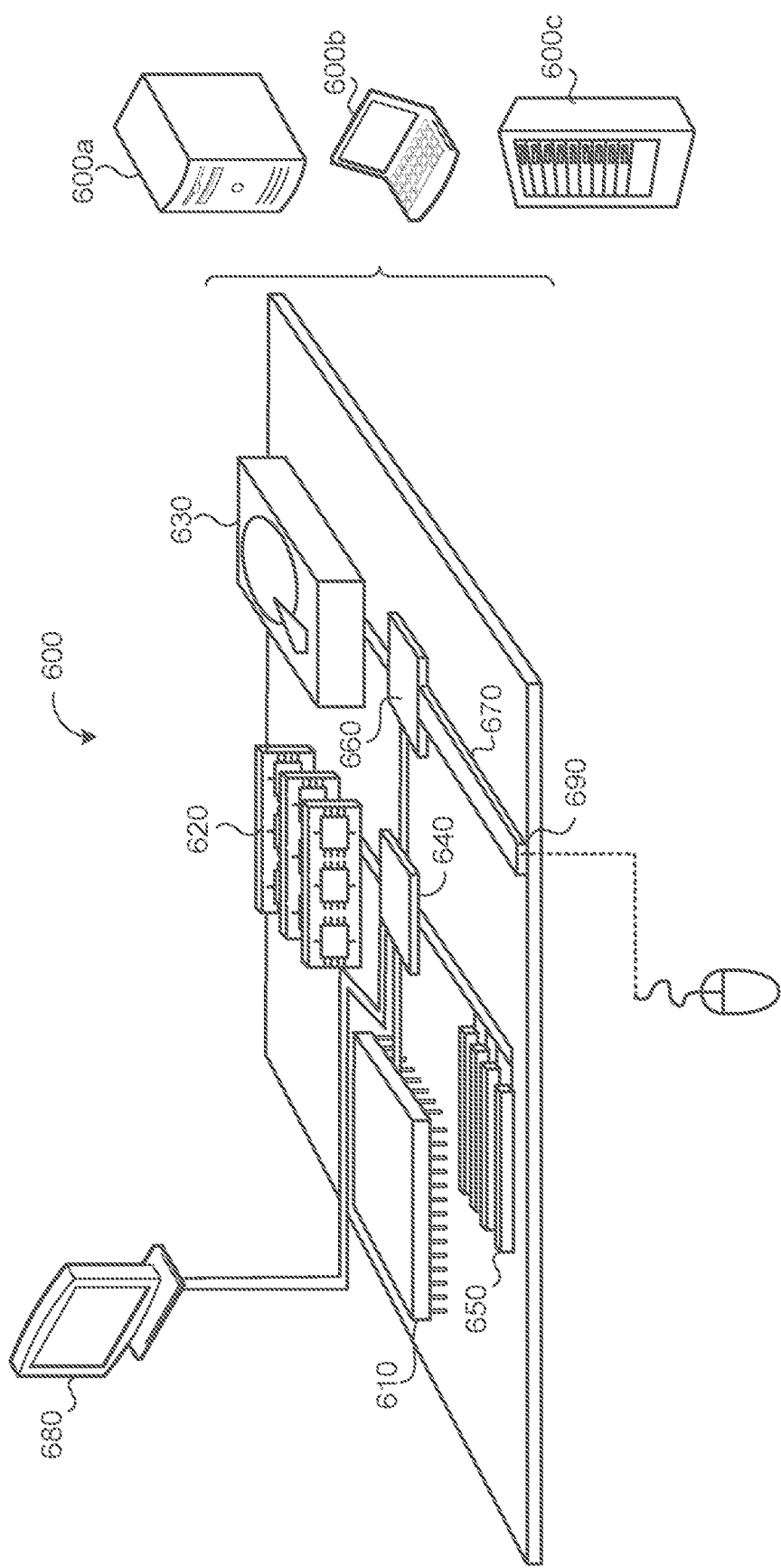
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program" Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
obtaining electromagnetic (EM) impediment data for a geographical area, the EM impediment data characterizing features of the geographical area that cause EM attenuation;
dividing the geographical area into a plurality of tiles, each tile of the plurality of tiles comprising a geometric shape that encompasses a distinct non-overlapping portion of the geographical area;
for each tile of the plurality of tiles:
determining one or more composable EM attenuation values for EM signals propagating through the distinct non-overlapping portion of the geographical area encompassed by the tile using the EM impediment data, each of the one or more composable EM attenuation values representing EM attenuation for signals passing through the geographical area encompassed by the tile; and
caching the one or more composable EM attenuation values determined for the corresponding tile; and
after caching the one or more composable EM attenuation values:
obtaining an EM attenuation request from a requester comprising a request to determine a total non-free-space EM attenuation value between a first geographical point and a second geographical point;
identifying a first tile that includes the first geographical point, a second tile that includes the second geographical point, and each intervening tile between the first tile and the second tile;
for each identified tile, selecting at least one cached composable EM attenuation value from the one or more composable EM attenuation values determined for the identified corresponding tile;

determining the total non-free-space EM attenuation value by summing the selected cached composable EM attenuation values; and in response to the EM attenuation request, providing the total non-free-space EM attenuation value to the requester.

2. The method of claim 1, wherein the EM impediment data comprises terrain impediments and non-terrain impediments.

3. The method of claim 1, wherein determining the one or more composable EM attenuation values for EM signals propagating through the distinct non-overlapping portion of the geographical area encompassed by the tile comprises determining at least one composable terrain EM attenuation value and at least one composable non-terrain EM attenuation value.

4. The method of claim 1, wherein determining the one or more composable EM attenuation values for EM signals propagating through the distinct non-overlapping portion of the geographical area encompassed by the tile comprises determining at least two composable EM attenuation values for at least two distinct altitudes.

5. The method of claim 1, wherein determining the one or more composable EM attenuation values for EM signals propagating through the distinct non-overlapping portion of the geographical area encompassed by the tile comprises determining at least two composable EM attenuation values for at least two distinct propagation directions through the distinct non-overlapping portion of the geographical area encompassed by the tile.

6. The method of claim 1, wherein determining the one or more composable EM attenuation values for EM signals propagating through the distinct non-overlapping portion of the geographical area encompassed by the tile comprises determining at least two composable EM attenuation values for at least two distinct frequencies.

7. The method of claim 1, wherein the geometric shape of at least one tile of the plurality of tiles is a hexagon.

8. The method of claim 1, wherein determining the one or more composable EM attenuation values for EM signals propagating through the distinct non-overlapping portion of the geographical area encompassed by the tile includes using direct measurements.

9. The method of claim 1, wherein the operations further comprise determining a total EM attenuation value using a sum of one or more loss paths of a loss tree.

10. The method of claim 9, wherein determining the total EM attenuation value uses the sum of one or more loss paths of the loss tree comprises an algorithmic loss.

11. A system comprising:
data processing hardware; and
memory hardware in communication with the data processing hardware, the memory hardware storing instructions that when executed on the data processing hardware cause the data processing hardware to perform operations comprising:
obtaining electromagnetic (EM) impediment data for a geographical area, the EM impediment data characterizing features of the geographical area that cause EM attenuation;
dividing the geographical area into a plurality of tiles, each tile of the plurality of tiles comprising a geometric shape that encompasses a distinct non-overlapping portion of the geographical area;
for each tile of the plurality of tiles:
determining one or more composable EM attenuation values for EM signals propagating through the distinct non-overlapping portion of the geographical area encompassed by the tile using the EM impediment data, each of the one or more composable EM attenuation values representing EM attenuation for signals passing through the geographical area encompassed by the tile; and
caching the one or more composable EM attenuation values determined for the corresponding tile; and
after caching the one or more composable EM attenuation values:
obtaining an EM attenuation request from a requester comprising a request to determine a total non-free-space EM attenuation value between a first geographical point and a second geographical point;
identifying a first tile that includes the first geographical point, a second tile that includes the second geographical point, and each intervening tile between the first tile and the second tile;
for each identified tile, selecting at least one cached composable EM attenuation value from the one or more composable EM attenuation values determined for the identified corresponding tile;
determining the total non-free-space EM attenuation value by summing the selected cached composable EM attenuation values; and
in response to the EM attenuation request, providing the total non-free-space EM attenuation value to the requester.

12. The system of claim 11, wherein the EM impediment data comprises terrain impediments and non-terrain impediments.

13. The system of claim 11, wherein determining the one or more composable EM attenuation values for EM signals propagating through the distinct non-overlapping portion of the geographical area encompassed by the tile comprises determining at least one composable terrain EM attenuation value and at least one composable non-terrain EM attenuation value.

14. The system of claim 11, wherein determining the one or more composable EM attenuation values for EM signals propagating through the distinct non-overlapping portion of the geographical area encompassed by the tile comprises determining at least two composable EM attenuation values for at least two distinct altitudes.

15. The system of claim 11, wherein determining the one or more composable EM attenuation values for EM signals propagating through the distinct non-overlapping portion of the geographical area encompassed by the tile comprises determining at least two composable EM attenuation values for at least two distinct propagation directions through the distinct non-overlapping portion of the geographical area encompassed by the tile.

16. The system of claim 11, wherein determining the one or more composable EM attenuation values for EM signals propagating through the distinct non-overlapping portion of the geographical area encompassed by the tile comprises determining at least two composable EM attenuation values for at least two distinct frequencies.

17. The system of claim 11, wherein the geometric shape of at least one tile of the plurality of tiles is a hexagon.

18. The system of claim 11, wherein determining the one or more composable EM attenuation values for EM signals propagating through the distinct non-overlapping portion of the geographical area encompassed by the tile includes using direct measurements.

19. The system of claim 11, wherein the operations further comprise determining a total EM attenuation value using a sum of one or more loss paths of a loss tree.

20. The system of claim 19, wherein determining the total EM attenuation value uses the sum of one or more loss paths of the loss tree comprises an algorithmic loss.

* * * * *